United States Patent
Newberg et al.

(10) Patent No.: US 12,422,448 B2
(45) Date of Patent: Sep. 23, 2025

(54) STALL DETECTION FOR AUTOLOADER AXES

(71) Applicant: Leica Biosystems Imaging, Inc., Vista, CA (US)

(72) Inventors: Nicholas Newberg, Vista, CA (US); Prentash Djelosevic, Vista, CA (US); Aaron Alan Stearrett, Vista, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 749 days.

(21) Appl. No.: 17/309,700

(22) PCT Filed: Aug. 6, 2020

(86) PCT No.: PCT/US2020/045258
§ 371 (c)(1),
(2) Date: Jun. 15, 2021

(87) PCT Pub. No.: WO2021/026383
PCT Pub. Date: Feb. 11, 2021

(65) Prior Publication Data
US 2022/0349909 A1 Nov. 3, 2022

Related U.S. Application Data

(60) Provisional application No. 62/883,581, filed on Aug. 6, 2019.

(51) Int. Cl.
*G01N 35/04* (2006.01)
*G01N 35/00* (2006.01)

(52) U.S. Cl.
CPC ....... *G01N 35/04* (2013.01); *G01N 35/00029* (2013.01); *G01N 2035/00039* (2013.01); *G01N 2035/0465* (2013.01)

(58) Field of Classification Search
CPC ................................. G01N 35/00029
See application file for complete search history.

(56) References Cited

U.S. PATENT DOCUMENTS

| | | | |
|---|---|---|---|
| 6,847,481 B1 | 1/2005 | Ludl et al. | |
| 2002/0001849 A1* | 1/2002 | Copeland | G01N 35/1002 436/46 |

(Continued)

FOREIGN PATENT DOCUMENTS

| | | |
|---|---|---|
| EP | 3291438 | 3/2018 |
| JP | H04-086947 U | 7/1992 |

(Continued)

OTHER PUBLICATIONS

Aperio GT 450, screenshot of Google image search results, accessed on Jan. 17, 2019.

(Continued)

*Primary Examiner* — Elizabeth A Robinson
*Assistant Examiner* — Austin Q Le
(74) *Attorney, Agent, or Firm* — Frost Brown Todd LLP

(57) ABSTRACT

A stall detection system is provided that determines if a glass slide in motion during an automated process is at risk for being damaged and stops motion in the event of an unacceptable risk of damage. The system includes one or more motors configured to move a glass slide (directly or indirectly). The motors are configured to generate a load resistance value. The system includes one or more processors that monitor the load resistance value of a motor during motion and compares the load resistance value to a predetermined threshold resistance value to determine the risk of a glass slide being damaged. The predetermined threshold resistance value may correspond to a risk of slide breakage in response to a force applied to any surface of the slide, or (Continued)

a risk of losing a controlling grip on a slide rack, or a risk of a motor skipping a motor step.

15 Claims, 11 Drawing Sheets

(56) References Cited

U.S. PATENT DOCUMENTS

2004/0169486 A1* 9/2004 Akiwa ................ H02P 8/38
318/685
2019/0101553 A1 4/2019 Newberg et al.

FOREIGN PATENT DOCUMENTS

| JP | 2012-013953 A | 1/2012 | |
|---|---|---|---|
| WO | WO 2003/038504 | 5/2003 | |
| WO | WO-2014105739 A1 * | 7/2014 | ............. G01N 1/312 |

OTHER PUBLICATIONS

Leica Biosystems: "Leica Aperio GT 450 RUO", uploaded Jul. 30, 2019, retrieved from the internet <https://vimeo.com/350887835>, accessed Sep. 8, 2022.
Japanese First Office Action dated Apr. 23, 2024, for Application No. 2021-538319, 5 pages.
International Search Report issued in application No. PCT/US2020/045258, dated Oct. 21, 2020.

* cited by examiner

STALL DETECTION FOR AUTOLOADER AXES

CROSS-REFERENCE TO RELATED APPLICATIONS

The present application claims priority to U.S. Patent Provisional App. No. 62/883,581, filed Aug. 6, 2019, which is hereby incorporated herein by reference as if set forth in full. In addition, the present application is related to the following applications, each of which are all hereby incorporated herein by reference as if set forth in full:
International Patent App. No. PCT/US2016/053581, filed Sep. 23, 2016;
International Patent App. No. PCT/US2017/028532, filed Apr. 20, 2017;
International Patent App. No. PCT/US2018/063456, filed Nov. 30, 2018;
International Patent App. No. PCT/US2018/063460, filed Nov. 30, 2018;
International Patent App. No. PCT/US2018/063450, filed Nov. 30, 2018;
International Patent App. No. PCT/US2018/063461, filed Nov. 30, 2018;
International Patent App. No. PCT/US2018/062659, filed Nov. 27, 2018;
International Patent App. No. PCT/US2018/063464, filed Nov. 30, 2018;
International Patent App. No. PCT/US2018/054460, filed Oct. 4, 2018;
International Patent App. No. PCT/US2018/063465, filed Nov. 30, 2018;
International Patent App. No. PCT/US2018/054462, filed Oct. 4, 2018;
International Patent App. No. PCT/US2018/063469, filed Nov. 30, 2018;
International Patent App. No. PCT/US2018/054464, filed Oct. 4, 2018;
International Patent App. No. PCT/US2018/046944, filed Aug. 17, 2018;
International Patent App. No. PCT/US2018/054470, filed Oct. 4, 2018;
International Patent App. No. PCT/US2018/053632, filed Sep. 28, 2018;
International Patent App. No. PCT/US2018/053629, filed Sep. 28, 2018;
International Patent App. No. PCT/US2018/053637, filed Sep. 28, 2018;
International Patent App. No. PCT/US2018/062905, filed Nov. 28, 2018;
International Patent App. No. PCT/US2018/063163, filed Nov. 29, 2018;
International Patent App. No. PCT/US2017/068963, filed Dec. 29, 2017;
International Patent App. No. PCT/US2019/020411, filed Mar. 1, 2019;
U.S. patent application Ser. No. 29/631,492, filed Dec. 29, 2017;
U.S. patent application Ser. No. 29/631,495, filed Dec. 29, 2017;
U.S. patent application Ser. No. 29/631,499, filed Dec. 29, 2017; and
U.S. patent application Ser. No. 29/631,501, filed Dec. 29, 2017.

BACKGROUND

Field of the Invention

The present invention generally relates to a digital pathology apparatus and more particularly relates to automated processing of individual glass slides within a digital pathology apparatus.

Related Art

Digital pathology is an image-based information environment which is enabled by computer technology that allows for the management of information generated from a physical glass slide. Digital pathology is enabled in part by virtual microscopy, which is the practice of preparing a specimen and depositing the specimen on a physical glass slide and then scanning the specimen on the physical glass slide and creating a digital slide image that can be stored, viewed, managed, and analyzed on a computer monitor. With the capability of imaging an entire glass slide, the field of digital pathology exploded and is currently regarded as one of the most promising avenues of diagnostic medicine in order to achieve even better, faster and cheaper diagnosis, prognosis and prediction of cancer and other important diseases.

Glass slides that are processed by a digital pathology apparatus are very fragile and highly valuable. These glass slides need to be protected in an automated digital pathology apparatus. In some instances, glass slides that are in transit between a first processing station and a second processing station within a digital pathology apparatus may be improperly positioned and get stuck or jammed or collide with some structure or otherwise encounter resistance during motion that can damage and even break the glass slides. Therefore, what is needed is a system and method that overcomes these significant problems found in the conventional systems as described above.

SUMMARY

Accordingly, described herein is a stall detection system for use with a digital pathology apparatus that is configured to determine if a glass slide is at risk of being damaged and then disable motion within the digital pathology apparatus to prevent damage to the glass slide.

In one aspect, a digital slide scanning apparatus includes a motor that is configured to move a glass slide during an automated process and generate a load resistance value when moving the glass slide. The digital slide scanning apparatus also includes one or more processors that are configured to set a predetermined threshold resistance value, control the motor to move the glass slide during the automated process, and monitor the load resistance value during the automated process. The one or more processors are also configured to compare the load resistance value to the predetermined threshold resistance value and control the motor to stop movement of the glass slide if the load resistance value exceeds the predetermined threshold resistance value.

In one aspect, a method performed by a digital slide scanning apparatus includes controlling a motor to move a glass slide during an automated process and determining a load resistance value of the motor while the glass slide is moving during the automated process. The method also includes comparing the load resistance value to a predetermined threshold resistance value and stopping movement of the glass slide if the load resistance value exceeds the predetermined threshold resistance value. Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Embodiments disclosed herein provide a digital pathology apparatus configured to convey glass slides from a first point to a second point under power of a motor and with stall detection monitoring to identify when a glass slide may potentially be damaged. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
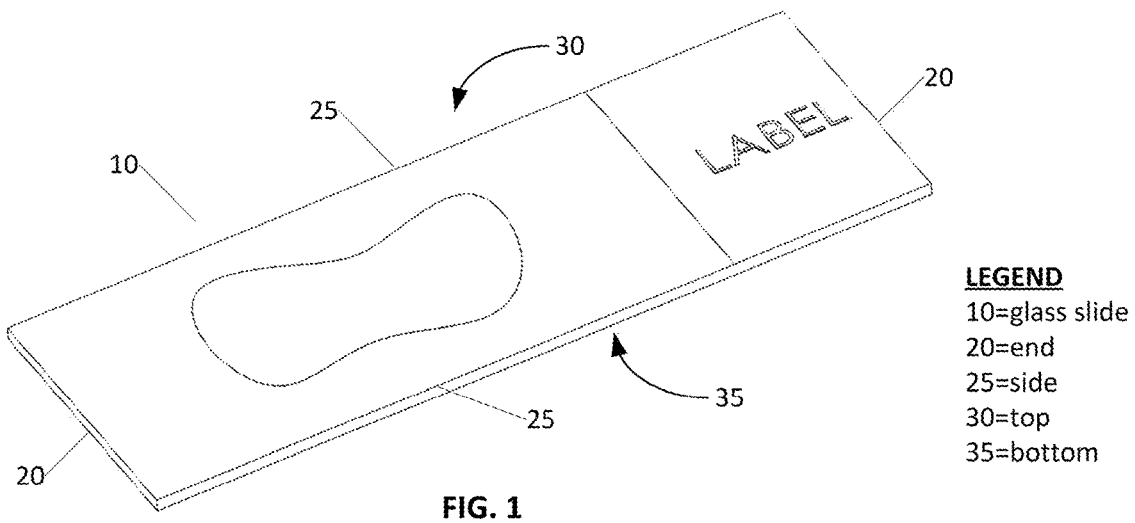
FIG. 1 is a perspective view diagram illustrating an example glass slide according to an embodiment of the invention.

FIG. 1 is a perspective view diagram illustrating an example glass slide 10 according to an embodiment of the invention. In the illustrated embodiment, the slide 10 includes four edge surfaces made up of two end surfaces 20, two side surfaces 25 and a top surface and a bottom surface 35. Glass slides such as slide 10 are very fragile and highly valuable. Glass slides having one or more specimen deposited on them are extremely valuable.

The nature of a glass slide 10 is such that it is easily damaged or broken. In particular, application of a first force to the slide 10 from the direction of an end 20 surface may damage or break the slide 10. Similarly, application of a second force to the slide 10 from the direction of a side 25 surface may damage or break the slide 10 and application of a third force to the slide 10 from the direction of the top 30 or bottom 35 surface may damage or break the slide 10. Importantly, the amount of the first second and third forces required to damage or break the slide 10 are not equal.

Figure 2A:
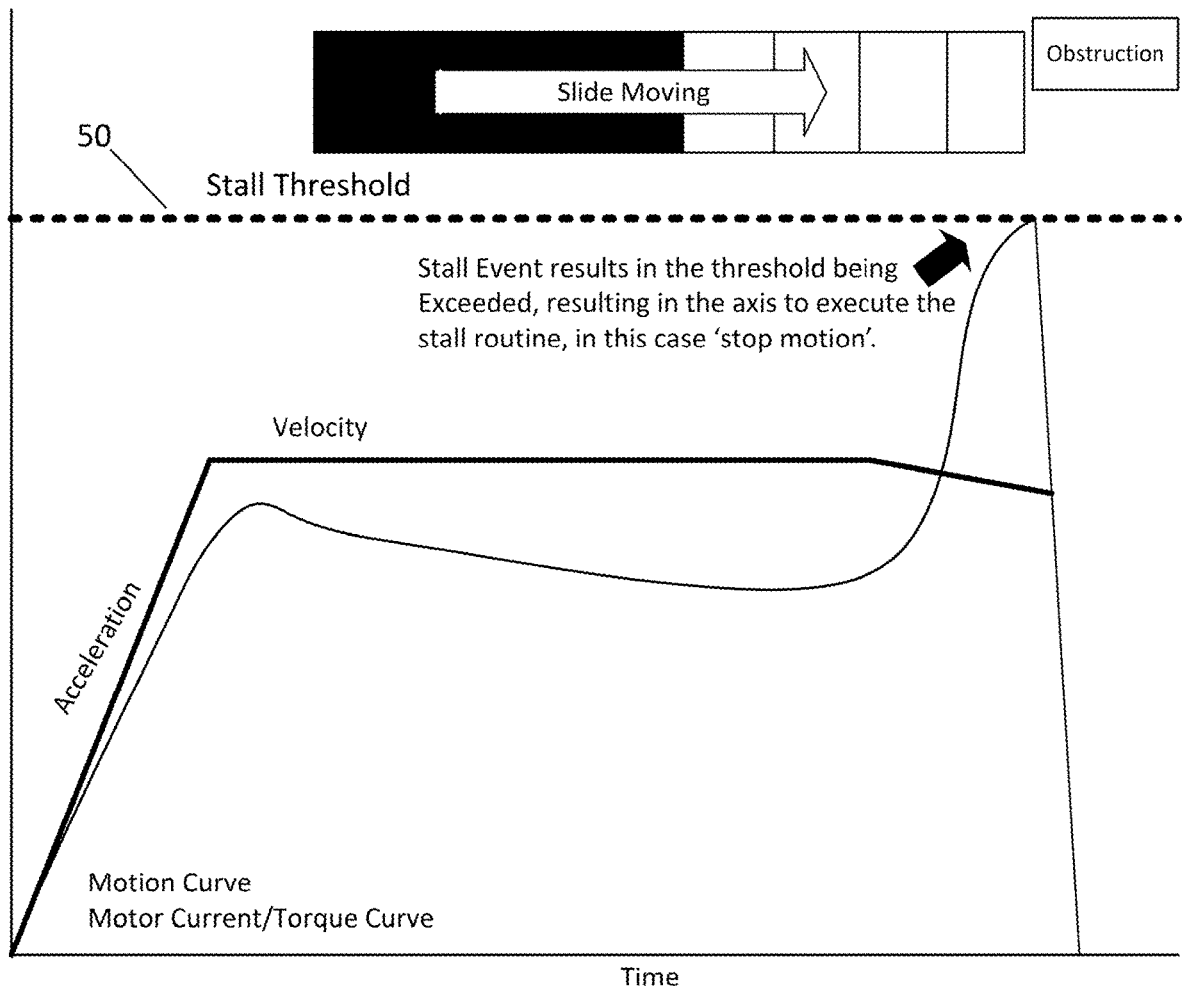
FIG. 2A is a graph diagram illustrating an example stall detection threshold according to an embodiment of the invention.

FIG. 2A is a graph diagram illustrating an example stall detection threshold 50 according to an embodiment of the invention. In the illustrated embodiment, a processor within a digital pathology apparatus monitors a signal from a motor within the digital pathology apparatus that is operating to move a glass slide. The signal from the motor is analyzed to identify the occurrence of a stall circumstance and to additionally determine an amount of force that is being applied by the motor in the stall circumstance. When the amount of force being applied by the motor reaches or exceeds the threshold 50, the processor is configured to control the motor to stop applying the force and thereby stop the attempted motion of the glass slide. Advantageously, the threshold value is set depending on the surface of the slide to which the force is being applied. Accordingly, the threshold value for a force being applied to a top or bottom surface of the slide may be less than the threshold value for a force being applied to a side surface of the slide, which may in turn be less than the threshold value for a force being applied to an end surface of the slide.

In the circumstance when the processor controls the motor to stop applying the force, recovery routines may be employed to attempt to reset to a known state and restart the motion or an operator may be notified for intervention. In this fashion, the glass slides are protected from damage or breakage and additionally, operators, slide racks, and the motors and other moving parts within the digital pathology apparatus are also protected in a stall circumstance.

Advantageously, the features described above and herein increase reliability, recovery, and safety for operators, glass slides, specimens, and mechanical components of any digital pathology apparatus configured to convey glass slides from a first point to a second point under power of a motor. The ability for the digital pathology apparatus to identify stall circumstances before a critical error occurs and then prevent the critical from happening is extremely valuable. Furthermore, configuring a mechanical device to avoid damaging or breaking highly valuable glass slides by detecting stall circumstances and recovering from such stall circumstances to a safe and known state/position streamlines digital pathology apparatus workflow, reliability, and longevity of the mechanical axes and other components.

In the illustrated embodiment, the threshold value is set with an appropriate margin to identify a stall circumstance prior to a critical error occurring. The stall circumstance event may include a slide colliding with the stage during a load, the slide rack moving out of the gripper fingers during transport, the user interfacing with the carousel upon rotation or many other circumstances with the potential to damage a glass slide. A threshold for each potential stall circumstance is calculated by experimental force measurements resulting in undesirable failure (e.g., slide breakage) during an application of the force from the motor during normal operation. Establishing appropriate thresholds for the various movements within a digital pathology apparatus allows for detection of the stall circumstance prior to a critical error occurring.

In one embodiment, the threshold value may be an average threshold value calculated based on a significant number of tests and evaluations performed across a significant number of digital pathology apparatuses and a significant number of motors. In an alternative embodiment, the threshold value may be specific to each machine and to each motor. For example, although each individual motor may be the same type of motor (e.g., the same part number), there may be differences in friction and other impediments to the operation of the motor that cause the stall circumstance threshold prior to a critical error occurring to vary. Accordingly, in one embodiment, the digital pathology apparatus is configured to determine a stall circumstance threshold value for each of the plurality of motors in the apparatus that drive movement that may damage a glass slide.

In the illustrated embodiment, the motion profile for the subject movement by a motor along a particular axis is important for the stall circumstance detection. For example, at low and high velocities, the load resistance feedback values from the motor are difficult to measure. Also, during acceleration and/or deceleration, the load resistance feedback values from the motor are not as reliable as during constant velocity. Therefore, the threshold values and for the various axes motion are optimized to successfully detect the stall circumstance with sufficient margin to ensure no false stoppages that slow down processing and no false continues that damage or break glass slides.

Additionally, stall detection may not be appropriate or desired for every possible movement within a digital pathology apparatus due to the mechanical design of the axis and/or potential interface of the collision. For example, there are instances where the probability of identifying a false stall circumstance is higher than the probability of a critical error occurring, or higher than the probability of identifying a true stall circumstance. One such example is the lift axis of the digital pathology apparatus, which has a high mechanical load and transports the slides in the rack up/down; while the slides are horizontal. The force required to break a slide resting in a rack horizontal is minimal in comparison to the mechanical load and variation in the lift axes. Accordingly, in one embodiment, stall circumstance detection may not be enabled on the lift system.

Furthermore, once a stall circumstance is identified, the next steps performed by the digital pathology apparatus may be critical for safe and reliable operation of the digital pathology apparatus. For example, the digital pathology apparatus may detect a stall circumstance and report a critical error which requires operator intervention to recover. In alternative examples, the digital pathology apparatus may detect a stall circumstance and be able to automatically recover by executing a programed routine to retry the movement, reset the position of an element, make various combinations of movements or any combination of these and other possible remedial actions to allow the digital pathology apparatus to safely recover from the detected stall circumstance and continue to the next operation without operator intervention.

Figure 2B:
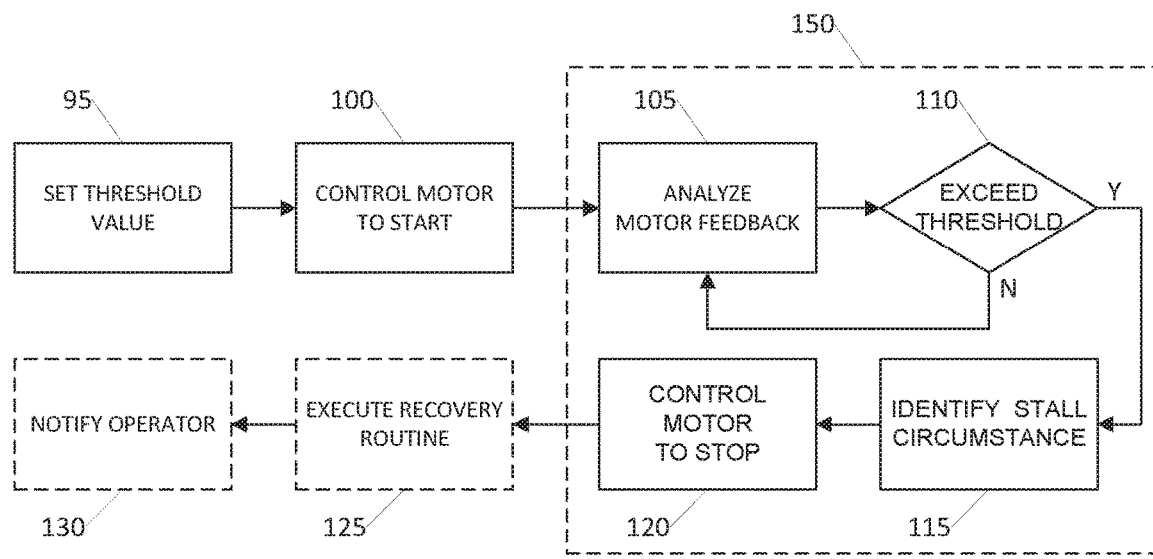
FIG. 2B is a flow diagram illustrating an example process for detecting a potential obstruction in a digital pathology apparatus according to an embodiment of the invention.

FIG. 2B is a flow diagram illustrating an example process for detecting a potential obstruction in a digital pathology apparatus according to an embodiment of the invention. In an embodiment, the process can be implemented in a digital pathology apparatus such as the one later described with respect to FIGS. 10A-10D and including individual motor assemblies that each include a motor and a microprocessor that drives the motor under control of the digital pathology apparatus processor or other controller. Initially, in step 95, a threshold value is set. As discussed above, the threshold value may be set according to a gross average across a plurality of motors and a plurality of apparatuses. Alternatively, the threshold value may be set for each motor in each apparatus.

Next, in step 100, the processor of the digital pathology apparatus controls a motor to start motion of an element within the digital pathology apparatus that is configured to carry slides directly (e.g., the element is a stage) or indirectly (e.g., the element is a slide rack carousel). In one embodiment, the processor of the digital pathology apparatus may instruct a secondary processor (e.g., a microprocessor in the motor assembly) to control the motor start driving motion. Example elements that are configured to carry slides include, but are not limited to, a slide rack carousel apparatus, a slide rack gripper apparatus, a slide rack lift apparatus, a slide push-pull apparatus, and a slide stage apparatus, just to name a few. An example element that is configured to move in the presence of a glass and therefore may damage a glass slide is the objective lens. In various embodiments, a digital pathology apparatus may include any of a tissue processor, a tissue embedder, a microtomer, a slide stainer, a cover slipper, and a digital slide scanner.

Next, in step 105 feedback from the motor being controlled is received and analyzed by a processor. In an embodiment, the feedback analyzed is the load resistance feedback value from the motor (also referred to herein as the "load resistance value"). For example, when there is a difference between the actual location of a stepper motor and the location of the stepper motor calculated by the processor, some amount of load resistance is present. In an embodiment, the motor assembly includes a microcontroller that monitors load resistance and determines the amount of load resistance that is present. For example, in one embodiment the steps shown in box 150 are carried out by this microcontroller. Accordingly, this microcontroller or another processor, in step 105, analyzes the amount of load resistance that is present and compares the amount of load resistance to a threshold value to determine in step 110 if the load resistance value exceeds a predetermined threshold value. Advantageously, the predetermined threshold value is set slightly below the amount of force corresponding to the load resistance value that is need to damage or break a glass slide. In an embodiment, the amount of force that is need to damage or break a glass slide is determined with respect to the surface of the glass slide upon which the force is being applied, for example, the top, bottom, an end, or a side. If the load resistance value does not exceed the predetermined threshold value, the processor continues to analyze the motor feedback and compare the load resistance value to the predetermined threshold value.

Next, in step 115, when the load resistance value does exceed the predetermined threshold value, the microcontroller or another processor identifies a stall circumstance and then in step 120 the microcontroller or another processor controls the motor to stop. This advantageously protects the glass slide from being damaged or broken by too much force being applied to the glass slide. Next, in step 125, the microcontroller or other processor may optionally execute a recovery routine to attempt to alleviate the stall circumstance. A recovery routine may include reversing the movement of mechanical elements and attempting to start over from a known position. Additional and alternative recovery routines may also be employed. Additionally, before, after, or in parallel with the optional step 125, the processor may, in step 130, optionally notify an operator of the stall condition so that the operator can alleviate the stall condition.

Figure 3A:
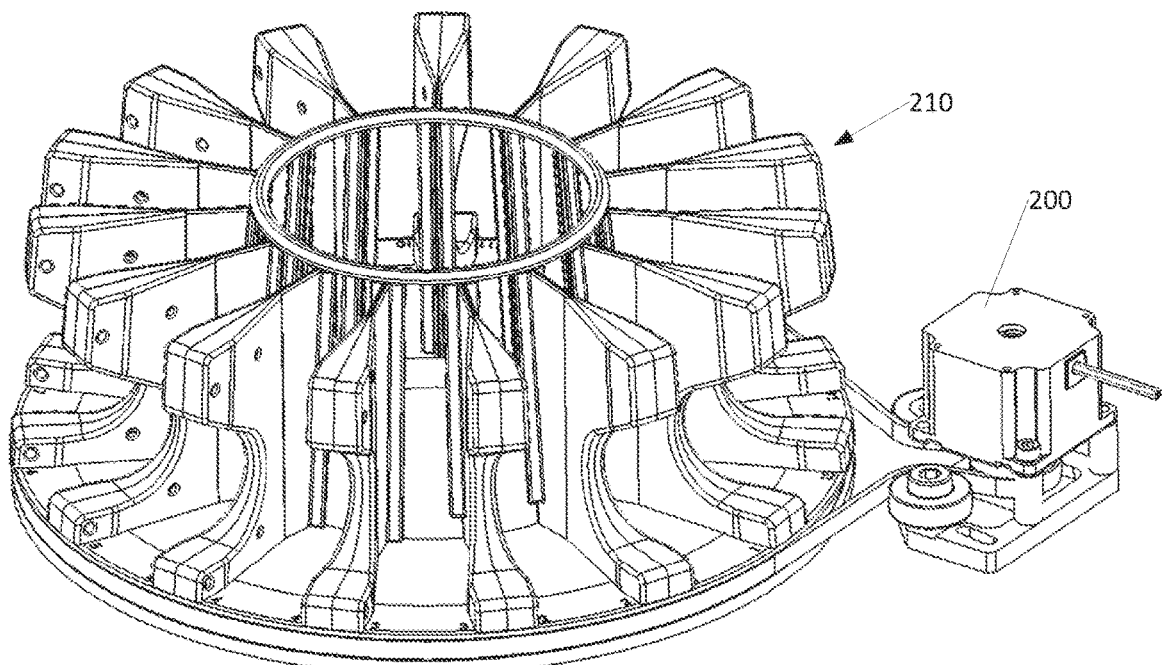
FIGS. 3A-3C are perspective view diagrams illustrating an example motor driving a carousel apparatus that carries glass slides according to an embodiment of the invention.
Figure 3B:
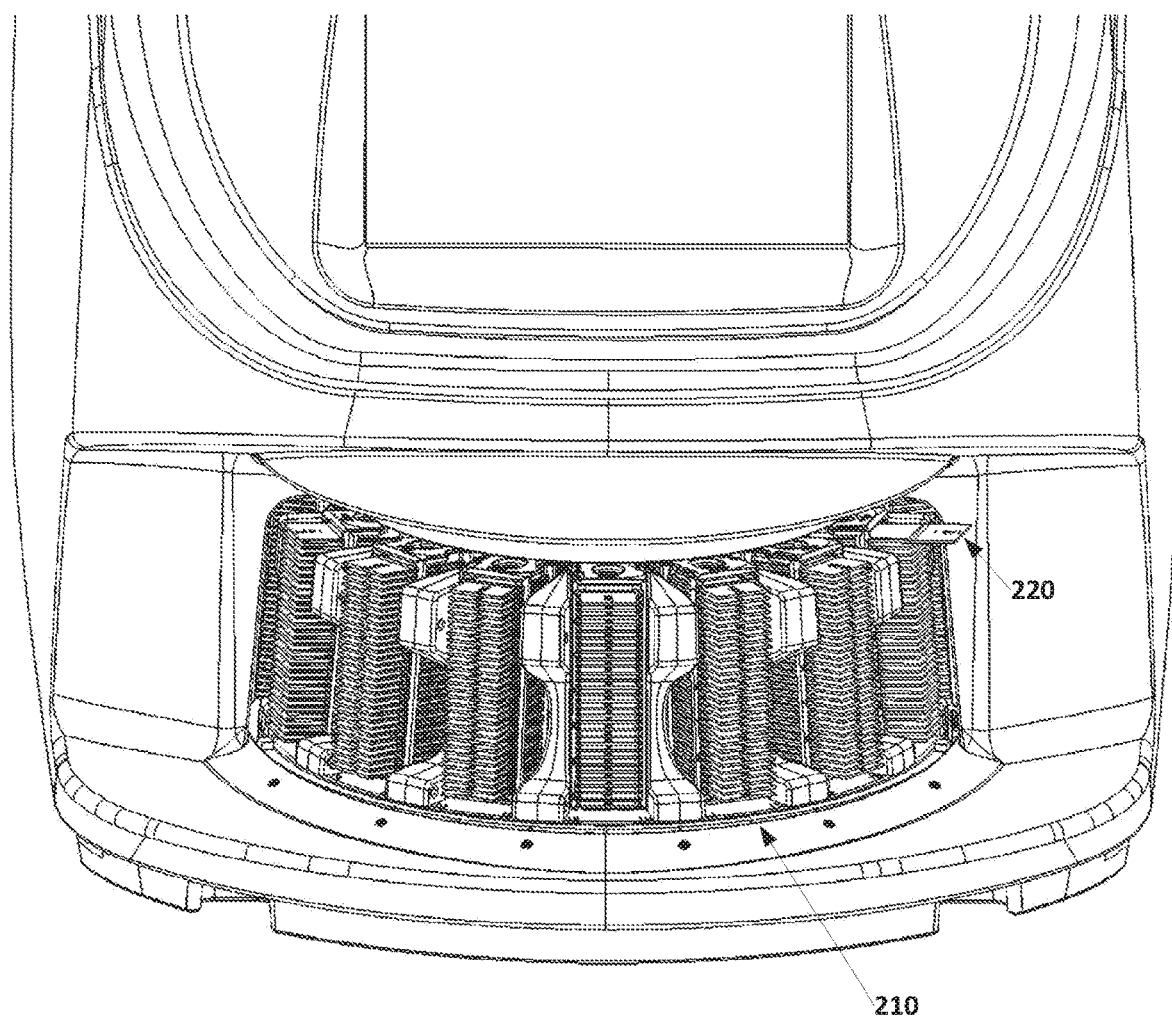
Figure 3C:
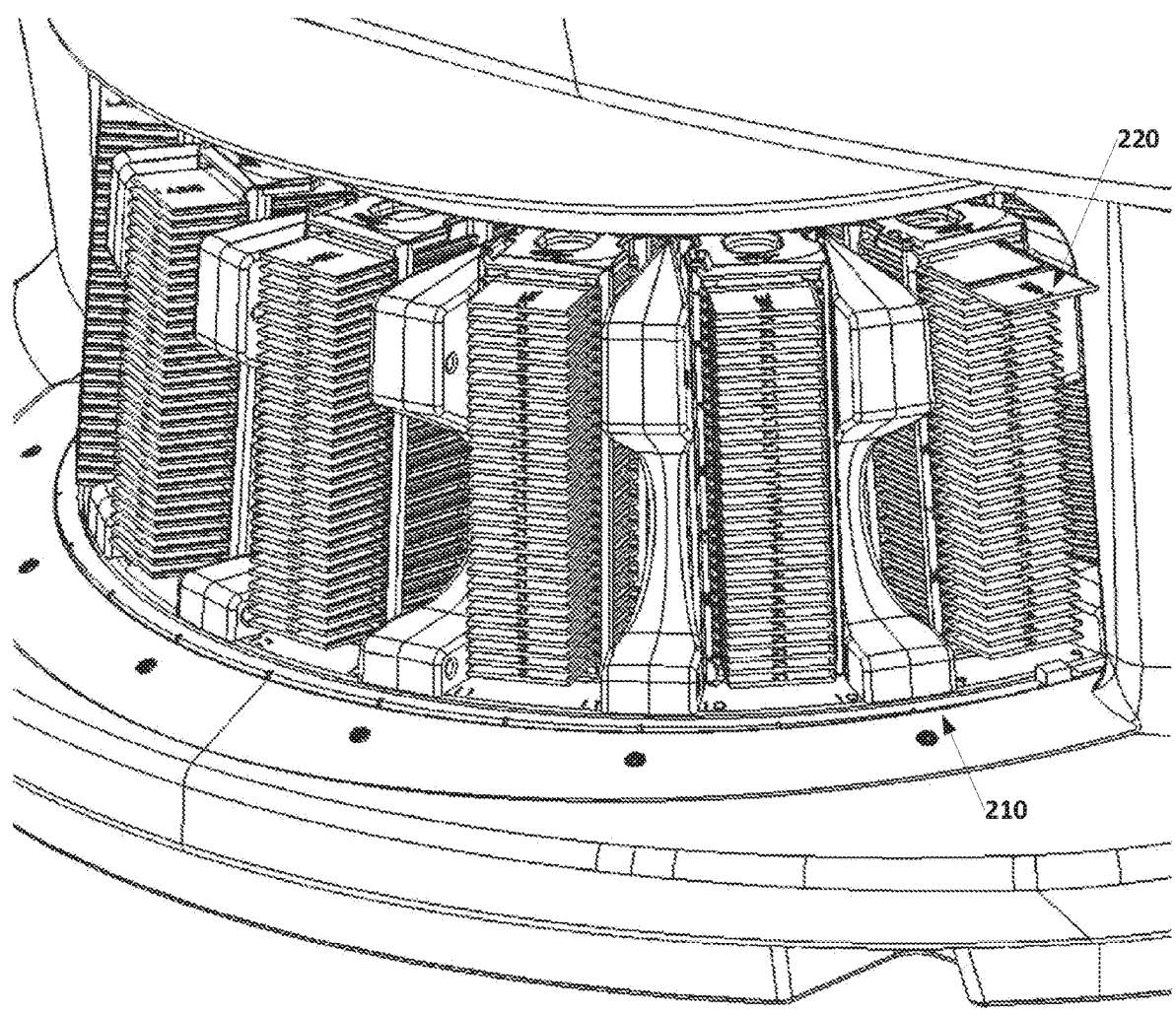

FIGS. 3A-3C are perspective view diagrams illustrating an example motor 200 driving a carousel 210 apparatus that carries glass slides 220 according to an embodiment of the invention. In the illustrated embodiments, the carousel 210 rotates circularly and the load resistance feedback value from the motor is determined by the load resistance to the circular rotation of the carousel 210. The threshold value is set slightly lower than the force required to damage or break a glass slide when applied to a side surface of the glass slide. A recovery routine may be employed by reversing the circular motion of the carousel 210 and then re-trying to rotate the carousel 210 in the original direction. In an embodiment, an increasing and variable reverse distance may be employed in a multi-attempt recovery routine. An alternative recovery routine may be employed by simply stopping and then re-attempting the movement in the original direction.

Figure 4A:
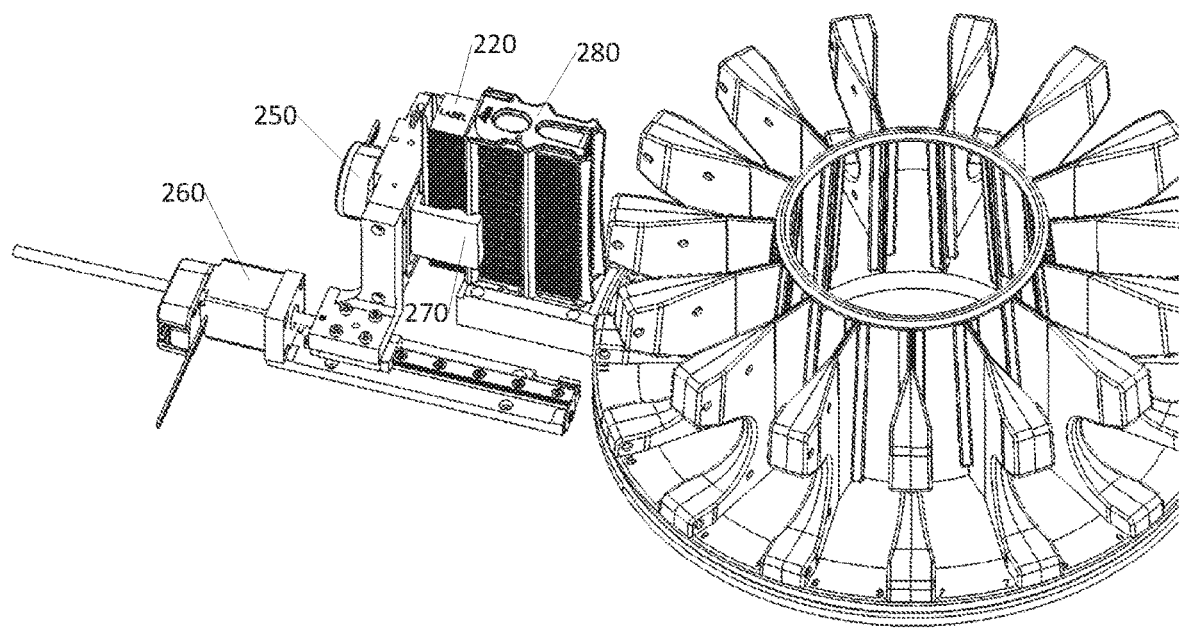
FIGS. 4A-4C are perspective view diagrams illustrating example motors driving a gripper apparatus that carries glass slides according to an embodiment of the invention.
Figure 4B:
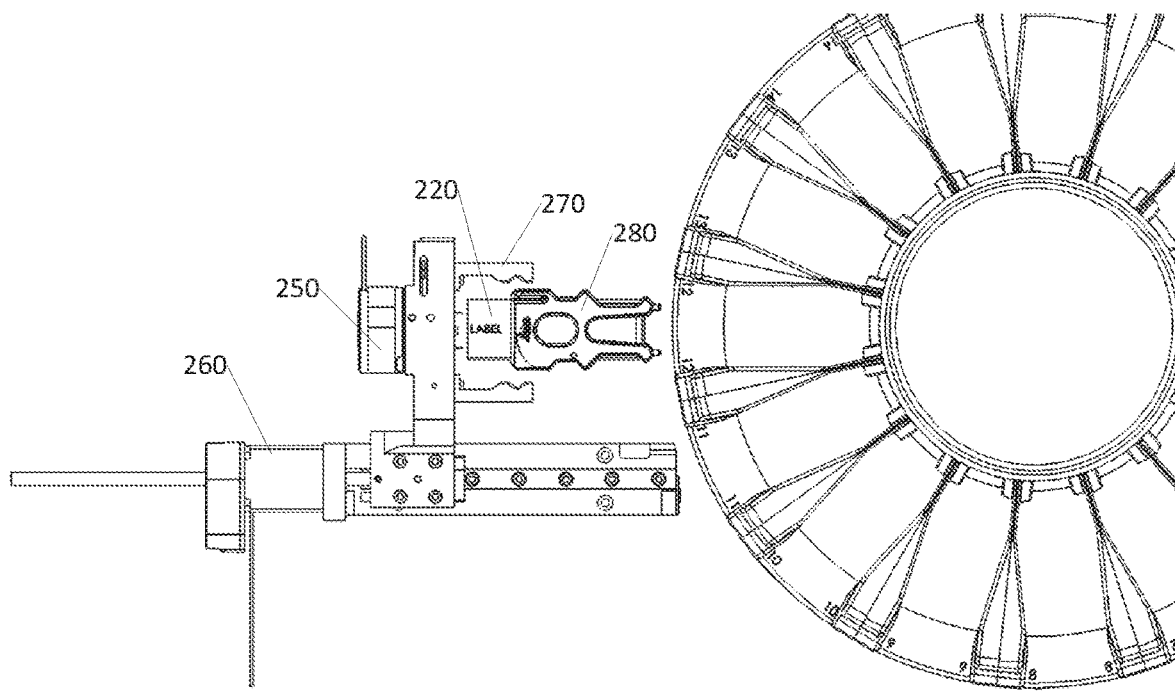
Figure 4C:
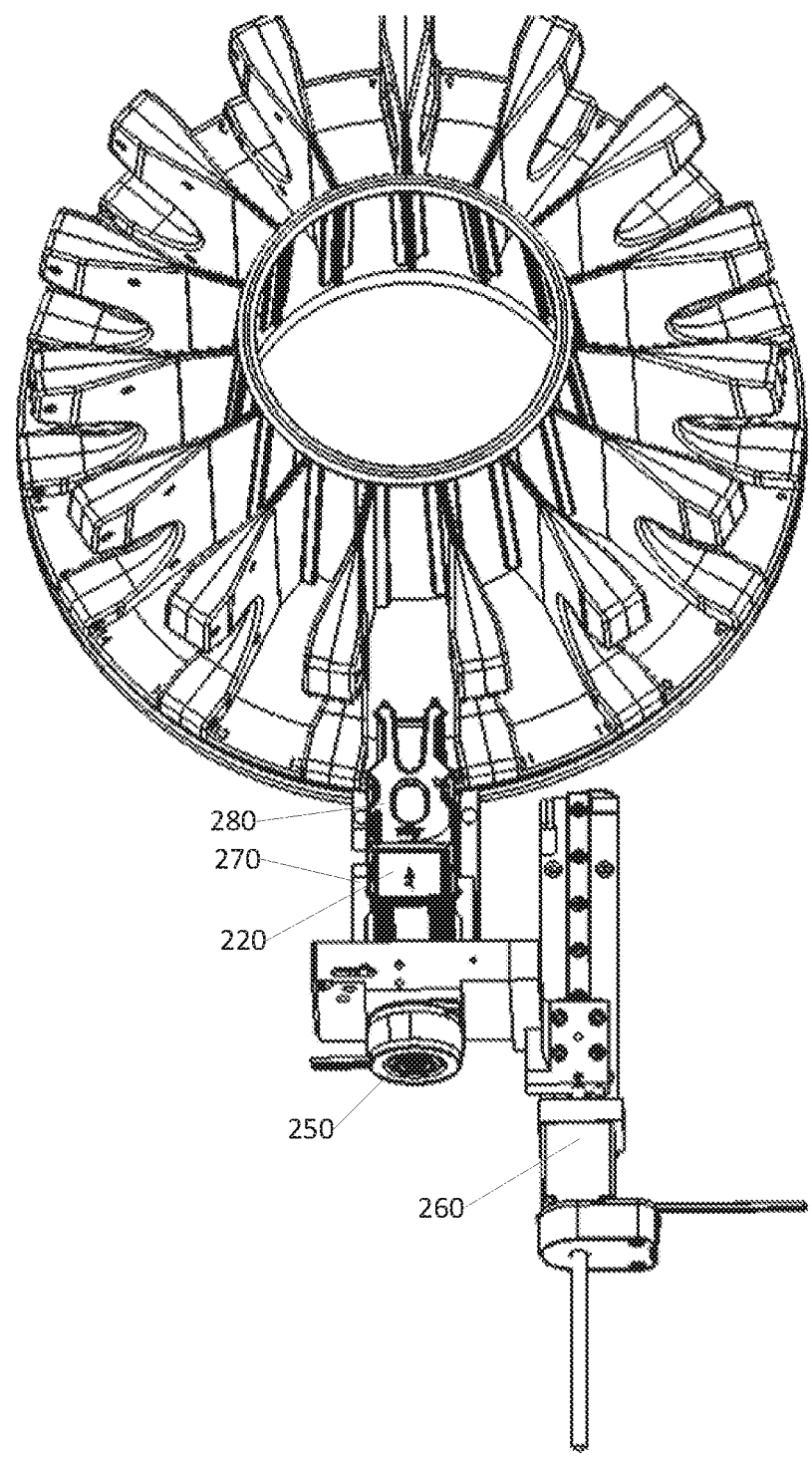

FIGS. 4A-4C are perspective view diagrams illustrating example motors 250, 260 driving a gripper 270 apparatus that carries glass slides 220 in a slide rack 280 according to an embodiment of the invention. In the illustrated embodiments, the gripper 270 reaches out and grips the sides of a slide rack 280 containing glass slides 220. When gripping a slide rack 280, the direction of the force applied by the motor 250 is toward a side surface of a glass slide 220 in the slide rack 280. When a slide rack 280 is secured in the grasp of the gripper 270, the gripper 270 extracts the slide rack from the carousel or inserts the slide rack into the carousel. When removing or replacing a slide rack 280, the direction of the force applied by the motor 260 is toward an end surface of a glass slide 220 in the slide rack 280.

Accordingly, when gripping a slide rack 280, the load resistance feedback value for motor 250 is determined by the load resistance of the linear motion of the gripper fingers toward the slide rack 280 and toward each other. The threshold value is set slightly lower than the force required to damage or break a glass slide when applied to a side surface of the glass slide. A recovery routine may be employed by reversing the linear motion of the gripper fingers and then re-trying to grasp the side rack 280. Alternatively, no recovery routine may be employed.

Similarly, when removing or replacing a slide rack 280, the load resistance feedback value for motor 260 is determined by the load resistance of the linear motion of the gripper 270 apparatus toward the carousel or away from the carousel. The threshold value is set slightly lower than the force required to pull a slide rack out of the gripper fingers when the gripper is holding a slide rack. Optional recovery routines may be employed by any combination moving the gripper 270 toward or away from the carousel, moving the carousel left right, moving the gripper fingers toward or away from each other, and moving the lift up or down.

Figure 5:
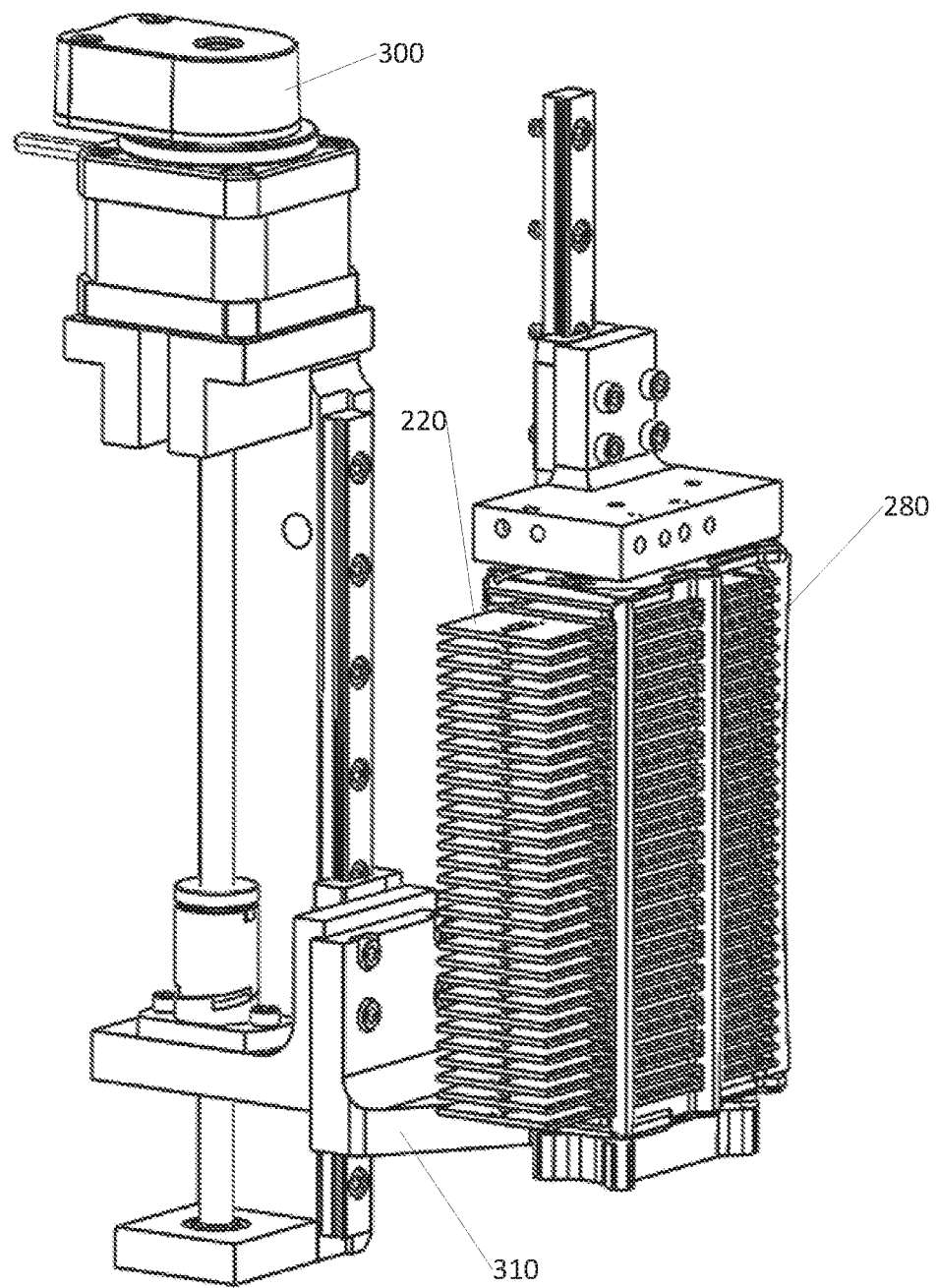
FIG. 5 is a perspective view diagram illustrating an example motor driving a lift apparatus that carries glass slides according to an embodiment of the invention.

FIG. 5 is a perspective view diagram illustrating an example motor 300 driving a lift 310 apparatus that carries glass slides 220 according to an embodiment of the invention. In the illustrated embodiment, a slide rack 280 carries glass slides 220 and the lift 310 conveys the slides 220 in the slide rack 280 to a level of the scanning stage. The load resistance feedback value of the motor 300 is determined by the load resistance of the linear motion of the lift 310. The threshold value is set slightly lower than the force required to damage or break a glass slide when applied to a top or bottom surface of the glass slide 220. A recovery routine may be employed by reversing the linear motion of the lift 310 and then re-trying to convey the slide rack 280 in the original direction. Alternatively, a recovery routine may be employed by moving the slide rack toward the carousel.

Figure 6A:
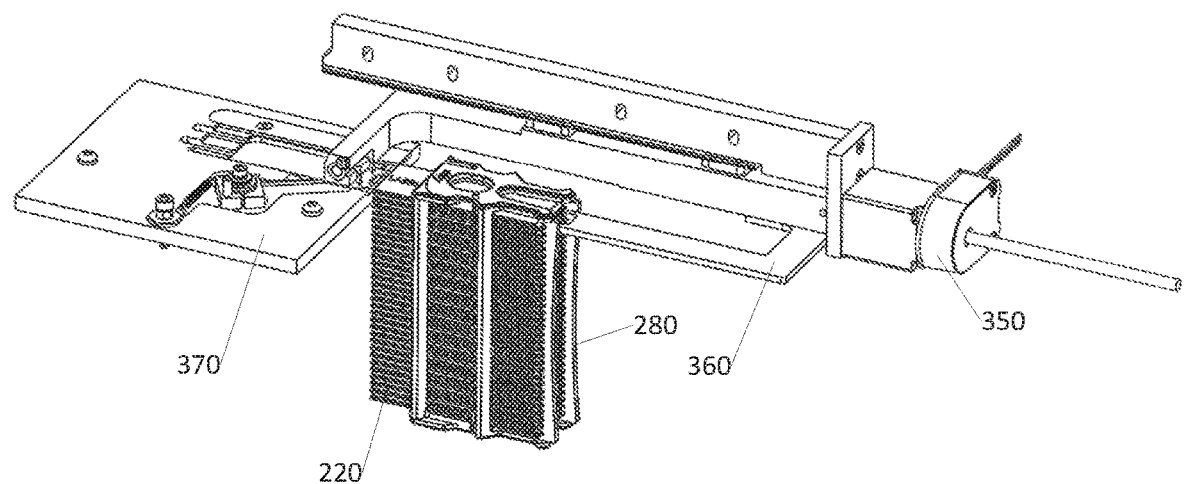
FIGS. 6A-6B are perspective view diagrams illustrating an example motor driving a push-pull apparatus that carries glass slides according to an embodiment of the invention.
Figure 6B:
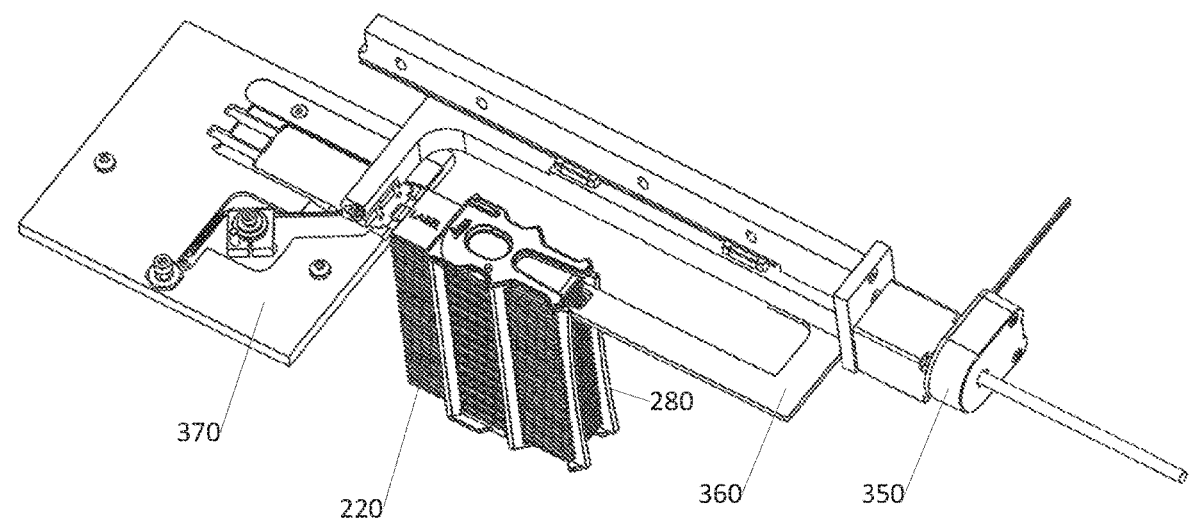

FIGS. 6A-6B are perspective view diagrams illustrating an example motor 350 driving a push-pull 360 apparatus that removes and replaces glass slides 220 between a slide rack 280 and a scanning stage 370 according to an embodiment of the invention. In one embodiment, the placement of glass slides 220 onto the scanning stage 370 and return of glass slides 220 to the slide rack 280 is the most dangerous environment for a glass slide in a digital slide scanner type of digital pathology apparatus. In the illustrated embodiment, a slide rack 280 is positioned adjacent to a scanning stage 370 and the push-pull 360 pushes a first slide onto the scanning stage 370. Subsequently, the push-pull 360 pulls the first slide from the scanning stage 370 back into the slide rack 280. The load resistance feedback value of the motor 350 is determined by the load resistance to the linear motion of the push-pull 360. The threshold value is set slightly lower than the force required to damage or break a glass slide when applied to an end surface of the glass slide 220. In one embodiment, the load resistance feedback value of the motor 350 is carefully monitored and compared to the threshold value within a certain distance from the start of motion (e.g., determined by a motor step count or by time) because the likelihood of a stall circumstance is increased within this certain distance. A recovery routine may be employed by any combination of pulling the glass slide 220 back into the slide rack, pushing the glass slide 220 back onto the stage 370, moving the stage 370 backward or forward or left or right, or moving the slide rack 280 up or down.

Figure 7:
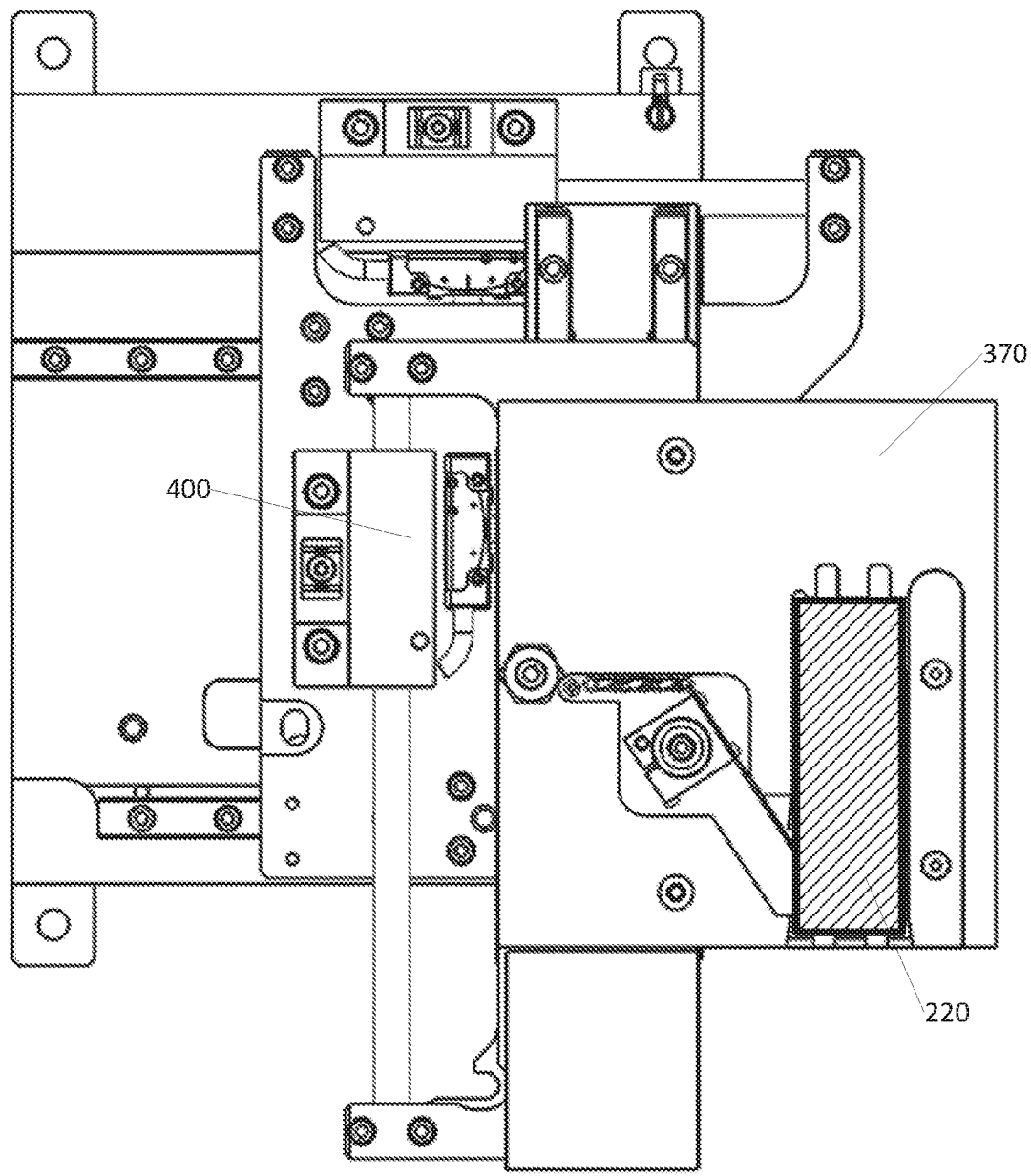
FIG. 7 is a top view diagram illustrating an example X-Y motor driving a stage apparatus that carries glass slides according to an embodiment of the invention.

FIG. 7 is a top view diagram illustrating an example X-Y motor 400 driving a stage 370 apparatus that carries glass slides 220 according to an embodiment of the invention. In the illustrated embodiment, a glass slide 220 is positioned on the stage 370 and the stage moves in the X-Y directions when receiving, scanning, and replacing the slide 220 into the slide rack. The load resistance feedback value of the motor 400 is determined by the load resistance to the X or Y linear motion of the stage 370. A first threshold value is set slightly lower than the force required to damage or break a glass slide when applied to a side surface of the glass slide 220 when moving in the X or Y direction and a second threshold value is set slightly lower than the force required to damage or break a glass slide when applied to an end surface of the glass slide 220 when moving in other of the X or Y direction. A recovery routine may be employed by any combination of pulling the glass slide 220 back into the slide rack, pushing the glass slide 220 back onto the stage 370, moving the stage 370 backward or forward or left or right, or moving the slide rack 280 up or down.

Figure 8:
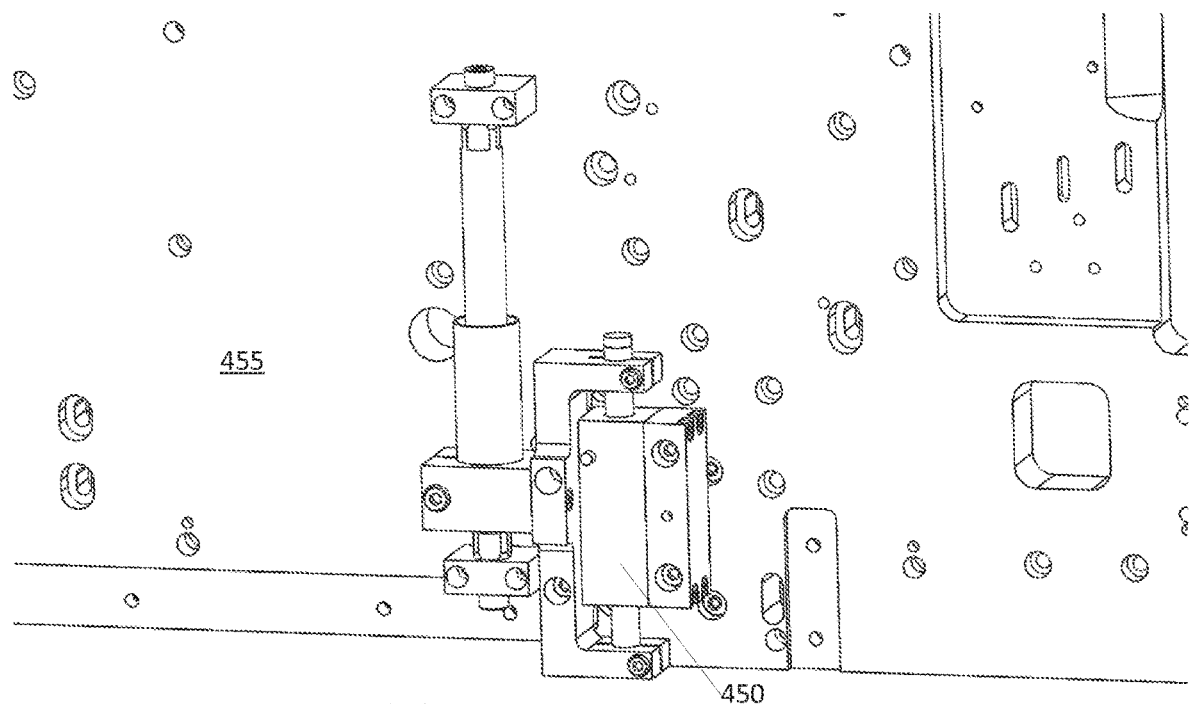
FIG. 8 is a perspective rear view diagram illustrating an example Z motor driving an objective lens apparatus according to an embodiment of the invention.

FIG. 8 is a perspective rear view diagram illustrating an example Z motor 450 that drives an objective lens apparatus according to an embodiment of the invention. In operation, a glass slide is positioned on the stage below the objective lens that is used for magnified scanning of a specimen on the glass slide. In the illustrated embodiment, the Z motor 450 is positioned on a rear side of a mount 455 and is configured to move the objective lens up and down in the Z direction, toward and away from the glass slide on the stage. The load resistance feedback value of the motor 450 is determined by the load resistance to the linear motion of the objective lens 470. The threshold value is set slightly lower than the force required to damage or break a glass slide when applied to a top surface of the glass slide. A recovery routine may be employed by any combination of moving the objective lens up or down in the Z axis, or moving the stage backward or forward or left or right.

Figure 9:
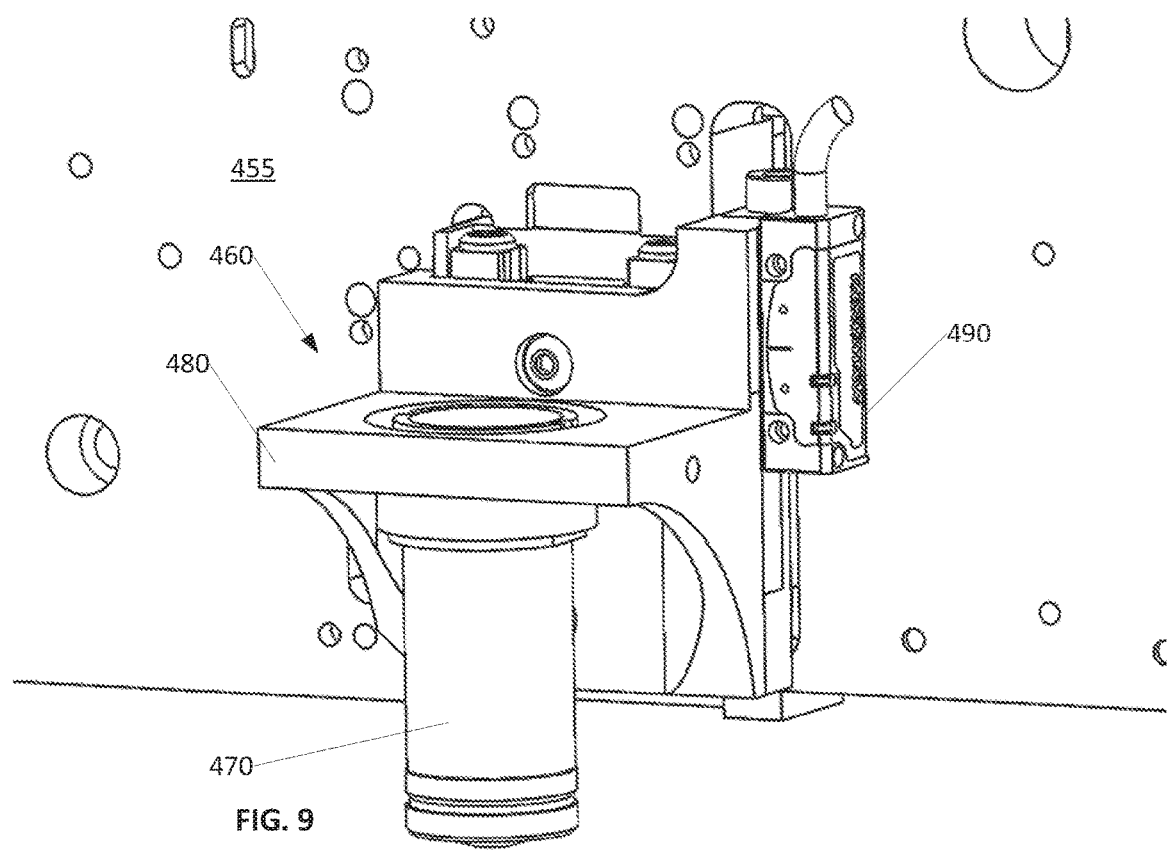
FIG. 9 is a perspective front view diagram illustrating an example objective lens apparatus driven by a Z motor according to an embodiment of the invention.

FIG. 9 is a perspective front view diagram illustrating an example objective lens apparatus 460 driven by a Z motor according to an embodiment of the invention. In operation, a glass slide is positioned on the stage below the objective lens 470 that is used for magnified scanning of a specimen on the glass slide. In the illustrated embodiment, the objective lens apparatus 460 is secured to a side of a mount opposite the Z motor 450. The objective lens apparatus 460 includes an objective lens 470, a bracket 480 and an encoder 490. The bracket 480 is configured to secure the objective lens 470 in a fixed position and to be moved in the Z direction by the Z motor 450. The position encoder 490 is configured to determine a position of the objective lens. As stated above, the Z motor 450 is configured to move the objective lens toward and away from the glass slide on the stage. The load resistance feedback value of the motor 450 is determined by the load resistance to the linear motion of the objective lens 470. The threshold value is set slightly lower than the force required to damage or break a glass slide when applied to a top surface of the glass slide. A recovery routine may be employed by any combination of moving the objective lens up or down in the Z axis, or moving the stage backward or forward or left or right.

Example Embodiments

In an embodiment, a digital pathology apparatus includes a motor configured to move a glass slide during an automated process and generate a load resistance feedback value when moving the glass slide. The apparatus also includes one or more processors configured to control the motor to move the glass slide during the automated process, receive the load resistance feedback value subsequent to beginning the automated process, compare the load resistance feedback value to a predetermined threshold, and control the motor to stop movement of the glass slide in response to determining that the load resistance feedback value exceeds a predetermined threshold.

In this embodiment, the automated process may be one of: moving the glass slide from a slide rack onto a scanning stage, moving the glass slide from the scanning stage to the slide rack, rotating a carousel containing one or more slide racks storing one or more glass slides, extracting a slide rack from a slide rack carousel, inserting a slide rack into a slide rack carousel, lifting a slide rack to a scanning stage level, gripping a slide rack, and scanning a glass slide.

In this embodiment, the predetermined threshold may correspond to a pressure that is less than a pressure to break a glass slide and the pressure to break a glass slide may correspond to: a pressure applied to a top or bottom surface, a pressure applied to an edge surface, wherein the edge surface is a short edge surface (end) or the edge surface is a long edge surface (side).

In this embodiment, the predetermined threshold may correspond to a force that is less than a force required to pull a slide rack from the grasp of a pair of gripper fingers.

In this embodiment, the motor may be a step motor and the predetermined threshold may correspond to a force that is less than a force required to cause the motor to skip steps.

In an embodiment, a method includes using one or more processors to control a motor to move a glass slide during an automated process, during motion of the glass slide, using the one or more processors to determine a load resistance value from the motor, using the one or more processors to compare the load resistance value to a predetermined threshold, and using the one or more processors to control the motor to stop movement of the glass slide in response to determining that the load resistance value exceeds a predetermined threshold.

In this method, the automated process may be one of moving the glass slide from a slide rack onto a scanning stage, moving the glass slide from the scanning stage to the slide rack, rotating a carousel containing one or more slide racks storing one or more glass slides, removing a slide rack from a slide rack carousel, replacing a slide rack into a slide rack carousel, lifting a slide rack to a scanning stage level, gripping a slide rack, and scanning a glass slide.

In this method, the predetermined threshold may correspond to a pressure that is less than a pressure to break a glass slide and the pressure to break a glass slide may correspond to: a pressure applied to a top or bottom surface, a pressure applied to an edge surface, wherein the edge surface is a short edge surface (end) or the edge surface is a long edge surface (side).

In this method, the predetermined threshold may correspond to a force that is less than a force required to pull a slide rack from the grasp of a pair of gripper fingers.

In this method, the motor may be a step motor and the predetermined threshold may correspond to a force that is less than a force required to cause the motor to skip steps.

In an embodiment, a digital slide scanning apparatus includes a plurality of motors and each motor is configured to drive movement of one or more parts during an automated process, and generate a load resistance value when driving movement. The apparatus also includes one or more processors that are configured to set a predetermined threshold resistance value for each of the plurality of motors, wherein at least two predetermined resistance values are not equal. The one or more processors are also configured to control a first of the plurality of motors to drive movement during a first automated process, monitor a first load resistance value generated by the first motor subsequent to beginning the first automated process, compare the first load resistance value to a first predetermined threshold resistance value corresponding to the first motor, and control the first motor to stop driving movement in response to determining that the first load resistance value exceeds the first predetermined threshold resistance value. The one or more processors are further configured to control a second of the plurality of motors to drive movement during a second automated process, monitor a second load resistance value generated by the second motor subsequent to beginning the second automated process, compare the second load resistance value to a second predetermined threshold resistance value corresponding to the second motor, and control the second motor to stop driving movement in response to determining that the second load resistance value exceeds the second predetermined threshold resistance value.

Figure 10A:
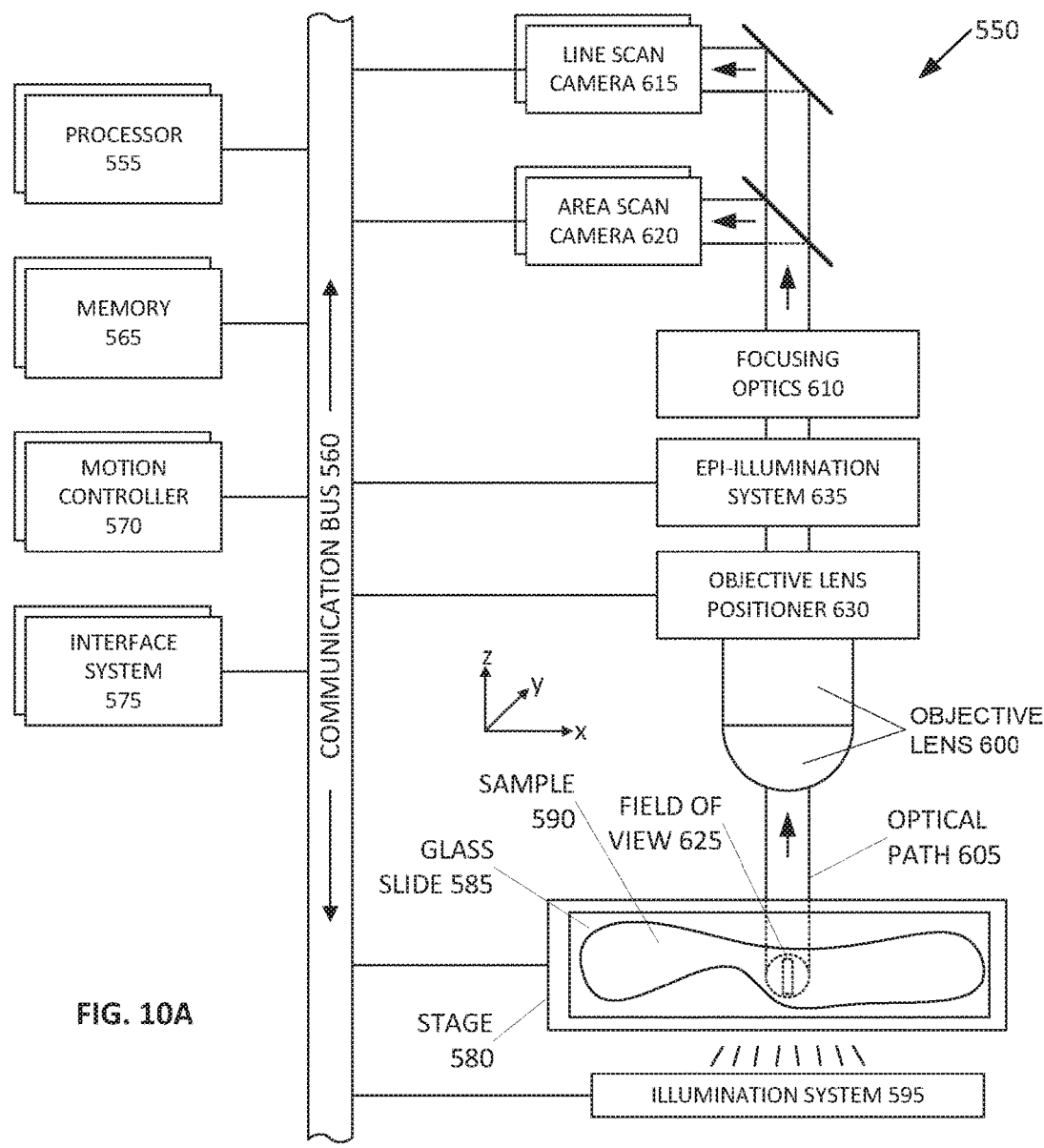
FIG. 10A is a block diagram illustrating an example processor enabled device 550 that may be used in connection with various embodiments described herein.

FIG. 10A is a block diagram illustrating an example processor enabled device 550 that may be used in connection with various embodiments described herein. Alternative forms of the device 550 may also be used as will be understood by the skilled artisan. In the illustrated embodiment, the device 550 is presented as a digital imaging device (also referred to herein as a scanner system or a scanning system) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity in the description that follows, these elements will be described in the singular except when needed to be described in the plural to convey the appropriate information.

The one or more processors 555 may include, for example, a central processing unit ("CPU") and a separate graphics processing unit ("GPU") capable of processing instructions in parallel or the one or more processors 555 may include a multicore processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal processing algorithms (e.g., digital signal processor), a slave processor subordinate to the main processor (e.g., back-end processor), an additional processor for controlling the line scan camera 615, the stage 580, the objective lens 600, and/or a display (not shown). Such additional processors may be separate discrete processors or may be integrated with the processor 555. In one embodiment, the processor is configured to control movement of the scanning stage and to control activation of the sensor pair. The processor is also configured to receive and analyze the signal from the sensor pair to determine the presence or absence of a glass slide or the stage, as appropriate for the circumstances. In one embodiment, the processor is configured to control the stage to stop movement if an improper position of a glass slide is determined.

The memory 565 provides storage of data and instructions for programs that can be executed by the processor 555. The memory 565 may include one or more volatile and persistent computer-readable storage mediums that store the data and instructions, for example, a random access memory, a read only memory, a hard disk drive, removable storage drive, and the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575 via the one or more communication busses 560 may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate XYZ movement of the stage 580 and the objective lens 600 (e.g., via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium) or external devices such as an image server system, an operator station, a user station, and an administrative server system that are connected to the scanner system 550 via a network (not shown).

The illumination system 595 is configured to illuminate a portion of the sample 590. The illumination system may include, for example, a light source and illumination optics. The light source could be a variable intensity halogen light source with a concave reflective mirror to maximize light output and a KG-1 filter to suppress heat. The light source could also be any type of arc-lamp, laser, or other source of light. In one embodiment, the illumination system 595 illuminates the sample 590 in transmission mode such that the line scan camera 615 and/or area scan camera 620 sense optical energy that is transmitted through the sample 590. Alternatively, or in combination, the illumination system 595 may also be configured to illuminate the sample 590 in reflection mode such that the line scan camera 615 and/or area scan camera 620 sense optical energy that is reflected from the sample 590. Overall, the illumination system 595 is configured to be suitable for interrogation of the microscopic sample 590 in any known mode of optical microscopy.

In one embodiment, the scanner system 550 optionally includes an epi-illumination system 635 to optimize the scanner system 550 for fluorescence scanning. Fluorescence scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration ("TDI") line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10 bit 64 linear array TDI line scan camera. It should be noted that a variety of bit depths for the line scan camera 615 can be employed for use with a fluorescence scanner embodiment of the scanning system 550.

The movable stage 580 is configured for precise XY movement under control of the processor 555 or the motion controller 570. The movable stage may also be configured for movement in Z under control of the processor 555 or the motion controller 570. The moveable stage is configured to position the sample in a desired location during image data capture by the line scan camera 615 and/or the area scan camera. The moveable stage is also configured to accelerate the sample 590 in a scanning direction to a substantially constant velocity and then maintain the substantially constant velocity during image data capture by the line scan camera 615. In one embodiment, the scanner system 550 may employ a high precision and tightly coordinated XY grid to aid in the location of the sample 590 on the movable stage 580. In one embodiment, the movable stage 580 is a linear motor based XY stage with high precision encoders employed on both the X and the Y axis. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA or RNA or protein that is deposited on any type of slide or other substrate, including any and all samples commonly known as a microarrays. The sample 590 may be a microtiter plate, for example a 96-well plate. Other examples of the sample 590 include integrated circuit boards, electrophoresis records, petri dishes, film, semiconductor materials, forensic materials, or machined parts.

Objective lens 600 is mounted on the objective positioner 630 which, in one embodiment, may employ a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in XYZ axes are coordinated and controlled in a closed loop manner using motion controller 570 under the control of the processor 555 that employs memory 565 for storing information and instructions, including the computer-executable programmed steps for overall scanning system 550 operation.

In one embodiment, the objective lens 600 is a plan apochromatic ("APO") infinity corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40×, 0.75 NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, etc. The objective lens 600 combined with focusing optics 610 provides the total magnification for the scanning system 550. In one embodiment, the focusing optics 610 may contain a tube lens and an optional 2× magnification changer. Advantageously, the 2× magnification changer allows a native 20× objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays, for example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615 so that the stage 580 can be in motion with respect to the line scan camera 615 during the digital image capture of the sample 590.

The image data generated by the line scan camera 615 is stored a portion of the memory 565 and processed by the processor 555 to generate a contiguous digital image of at least a portion of the sample 590. The contiguous digital image can be further processed by the processor 555 and the revised contiguous digital image can also be stored in the memory 565.

In an embodiment with two or more line scan cameras 615, at least one of the line scan cameras 615 can be configured to function as a focusing sensor that operates in combination with at least one of the line scan cameras 615 that is configured to function as an imaging sensor. The focusing sensor can be logically positioned on the same optical axis as the imaging sensor or the focusing sensor may be logically positioned before or after the imaging sensor with respect to the scanning direction of the scanner system 550. In such an embodiment with at least one line scan camera 615 functioning as a focusing sensor, the image data generated by the focusing sensor is stored in a portion of the memory 565 and processed by the one or more processors 555 to generate focus information to allow the scanner system 550 to adjust the relative distance between the sample 590 and the objective lens 600 to maintain focus on the sample during scanning. Additionally, in one embodiment the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data, e.g., an adjacent stripe. Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image strip. A plurality of adjacent image strips are similarly combined together to form a contiguous digital image of a portion or the entire sample 590. The scanning of the sample 590 may include acquiring vertical image strips or horizontal image strips. The scanning of the sample 590 may be either top-to-bottom, bottom-to-top, or both (bi-directional) and may start at any point on the sample. Alternatively, the scanning of the sample 590 may be either left-to-right, right-to-left, or both (bi-directional) and may start at any point on the sample. Additionally, it is not necessary that image strips be acquired in an adjacent or contiguous manner. Furthermore, the resulting image of the sample 590 may be an image of the entire sample 590 or only a portion of the sample 590.

In one embodiment, computer-executable instructions (e.g., programmed modules and software) are stored in the memory 565 and, when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550 either directly or indirectly, for example via a network (not shown).

Figure 10B:
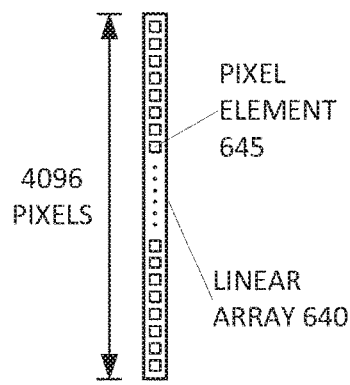
FIG. 10B is a block diagram illustrating an example line scan camera having a single linear array.

FIG. 10B illustrates a line scan camera having a single linear array 640, which may be implemented as a charge coupled device ("CCD") array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024, and 4096 pixels. The pixels 645 are arranged in a linear fashion to define a field of view 625 for the linear array 640. The size of the field of view varies in accordance with the magnification of the scanner system 550.

Figure 10C:
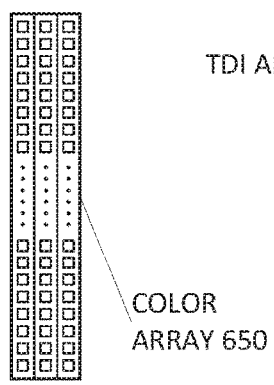
FIG. 10C is a block diagram illustrating an example line scan camera having three linear arrays.

FIG. 10C illustrates a line scan camera having three linear arrays, each of which may be implemented as a CCD array. The three linear arrays combine to form a color array 650. In one embodiment, each individual linear array in the color array 650 detects a different color intensity, for example red, green, or blue. The color image data from each individual linear array in the color array 650 is combined to form a single field of view 625 of color image data.

Figure 10D:
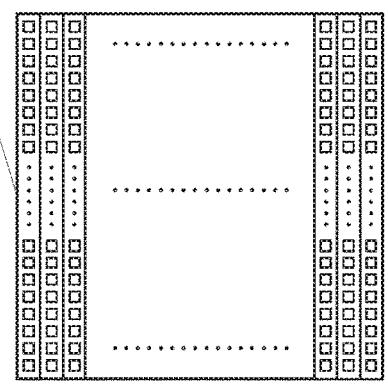
FIG. 10D is a block diagram illustrating an example line scan camera having a plurality of linear arrays.

FIG. 10D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays, for example common formats of TDI line scan cameras include 24, 32, 48, 64, 96, 120 and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A digital slide scanning apparatus, comprising:
   a motor configured to generate a load resistance value when moving a glass slide during a process;
   one or more hardware processors configured to:
   monitor the load resistance value during the process,
   compare the load resistance value to a predetermined threshold resistance value, the predetermined threshold resistance value corresponding to a pressure that is less than a pressure to break the glass slide, and
   control the motor to stop movement of the glass slide in response to determining that the load resistance value exceeds the predetermined threshold resistance value,
   wherein the load resistance value is defined by a difference between a first location of the motor and a second location of the motor, wherein the first location is an actual location of the motor and the second location is a calculated location of the motor.

2. The apparatus of claim 1, wherein the process is one of:
   moving the glass slide from a slide rack onto a scanning stage,
   moving the glass slide from the scanning stage to the slide rack, or rotating a carousel containing one or more slide racks storing one or more glass slides.

3. The apparatus of claim 1, wherein the pressure to break the glass slide corresponds to a pressure applied to a top or bottom surface of the glass slide.

4. The apparatus of claim 1, wherein the pressure to break the glass slide corresponds to a pressure applied to an edge surface of the glass slide.

5. The apparatus of claim 4, wherein the edge surface is an end surface.

6. The apparatus of claim 4, wherein the edge surface is a side surface.

7. The apparatus of claim 1, wherein the process is one of extracting a slide rack from a carousel, and inserting a slide rack into the carousel.

8. The apparatus of claim 1, wherein the predetermined threshold resistance value corresponds to a force that is less than a force required to pull a slide rack from the grasp of a pair of gripper fingers.

9. The apparatus of claim 1, wherein the process is gripping a slide rack.

10. The apparatus of claim 1, wherein the motor is a step motor and wherein the predetermined threshold resistance value corresponds to a force that is less than a force required to cause the motor to skip steps.

11. The apparatus of claim 1, wherein the predetermined threshold resistance value corresponds to a force that is less than a force generated by the glass slide colliding with a scanning stage while loading the glass slide.

12. The apparatus of claim 1, wherein the predetermined threshold resistance value corresponds to a force that is less than a force generated by an operator interfacing with a carousel during rotation of the carousel.

13. The apparatus of claim 1, wherein the one or more hardware processors are further configured to, after controlling the motor to stop movement of the glass slide, initiate a recovery routine.

14. The apparatus of claim 13, wherein the recovery routine comprises reversing the movement of the glass slide to a known position to restart the process.

15. The apparatus of claim 1, wherein the one or more hardware processors are further configured to, after controlling the motor to stop movement of the glass slide, notify an operator of the determination.

* * * * *